United States Patent [19]

Dyck et al.

[11] Patent Number: 5,148,579
[45] Date of Patent: Sep. 22, 1992

[54] TRANSVERSALLY WEDGED CABLE HOOK

[75] Inventors: William Dyck, Delta; Harry Jones, Vancouver; William Jordan, Surrey, all of Canada

[73] Assignee: Wire Rope Industries Ltd., Pointe-Claire-Quebec, Canada

[21] Appl. No.: 725,686

[22] Filed: Jul. 3, 1991

[30] Foreign Application Priority Data

Jul. 3, 1990 [CA] Canada ................................. 2020355

[51] Int. Cl.⁵ ............................................ F16G 11/04
[52] U.S. Cl. ................................. 24/136 R; 24/115 M
[58] Field of Search ...................... 24/136 R, 115 M; 403/374, 409.1; 294/102.1, 103.1; 441/50, 52, 54

[56] References Cited

U.S. PATENT DOCUMENTS 1,154,916  9/1915  Evans ................................. 24/136 R
4,125,919  11/1978  Dumont ........................... 24/136 R

FOREIGN PATENT DOCUMENTS 1158422  12/1983  Canada.
662201  12/1951  United Kingdom ............. 24/115 M Primary Examiner—James R. Brittain
Attorney, Agent, or Firm—Fleit, Jacobson, Cohn, Price, Holman & Stern

[57] ABSTRACT

A cable hook comprises a body member having a longitudinal channel of generally rectangular cross-section formed therein for receiving a portion of a cable against one wall thereof, a cable clamping member laterally movable in such channel and having an inner surface engaging the cable and a longitudinally double-tapered inverted V-shaped outer surface, a transverse aperture extending through the channel, and a wedge member insertable in such transverse aperture and having a vertically tapered surface for driving the cable clamping member against the cable in the channel and a transversally double-tapered surface mating the longitudinally double-tapered surface of the cable clamping member to provide oppositely acting wedging surfaces generating increased clamping action during pulling of the cable in either direction.

6 Claims, 3 Drawing Sheets

TRANSVERSALLY WEDGED CABLE HOOK

This invention relates to a transversally wedged cable hook, and more particularly to a transversally wedged cable hook for use in joining individual bundles of logs in a log raft.

A log raft is normally formed of a plurality of log bundles assembled together, each bundle being made up of several individual logs secured together using conventional wire rope straps and fittings. The bundles are usually assembled in the wood and transported by truck to the water where they are grouped together into a raft. In assembling a raft, several bundles are arranged side by side to form a row and several rows of log bundles are lined up end to end between a head boom stick and a tail boom stick. Wire ropes ar used to interconnect the head and tail boom sticks longitudinally and a wire rope known as a swifter line is used to contain the bundles laterally in each row. The swifter lines are secured to the longitudinal lines using conventional cable hooks such as the one disclosed in Canadian Patent No. 1,158,422.

One problem encountered with conventional cable hooks is that they often become loose when the cable is pulled in a direction opposite to the direction that the wedge member of the cable hook is driven, which happens frequently when maneuvering a log raft on a body of water.

It is therefore the object of the present invention to provide a transversally wedged cable hook having a longitudinally double-tapered clamping member so that pulling on the rope clamped into the hook in either direction will generate increased clamping action on the rope.

The transversally wedged cable hook in accordance with the present invention comprises a body member having a longitudinal channel of generally rectangular cross-section formed therein for receiving a portion of a cable against one wall thereof, a cable clamping member laterally movable in such channel and having an inner surface engaging the cable and a longitudinally double-tapered inverted V-shaped outer surface, a transverse aperture extending through the channel in the body member, and a wedge member insertable in such transverse aperture and having a vertically tapered surface for driving the clamping member against the cable in the channel and a transversally double-tapered surface mating the longitudinally double-tapered inverted V-shaped outer surface of the clamping member to provide oppositely acting tapered surfaces generating increased clamping action during pulling of the cable in either direction.

The body member of the clamp has an extension for partly closing the top of the channel leaving a longitudinal slot for inserting the cable into the channel. Such extension has an opening therein for allowing passage of the wedge member.

The back portion of the member is preferably provided with transverse reinforcing ribs located at the opposite ends and the centre thereof and the wedge member is formed of two separate leg portions joined at the top, each leg position engaging a separate tapered surface of the cable clamping member.

The invention will now be disclosed, by way of example, with reference to the accompanying drawings in which.

Figure 1:
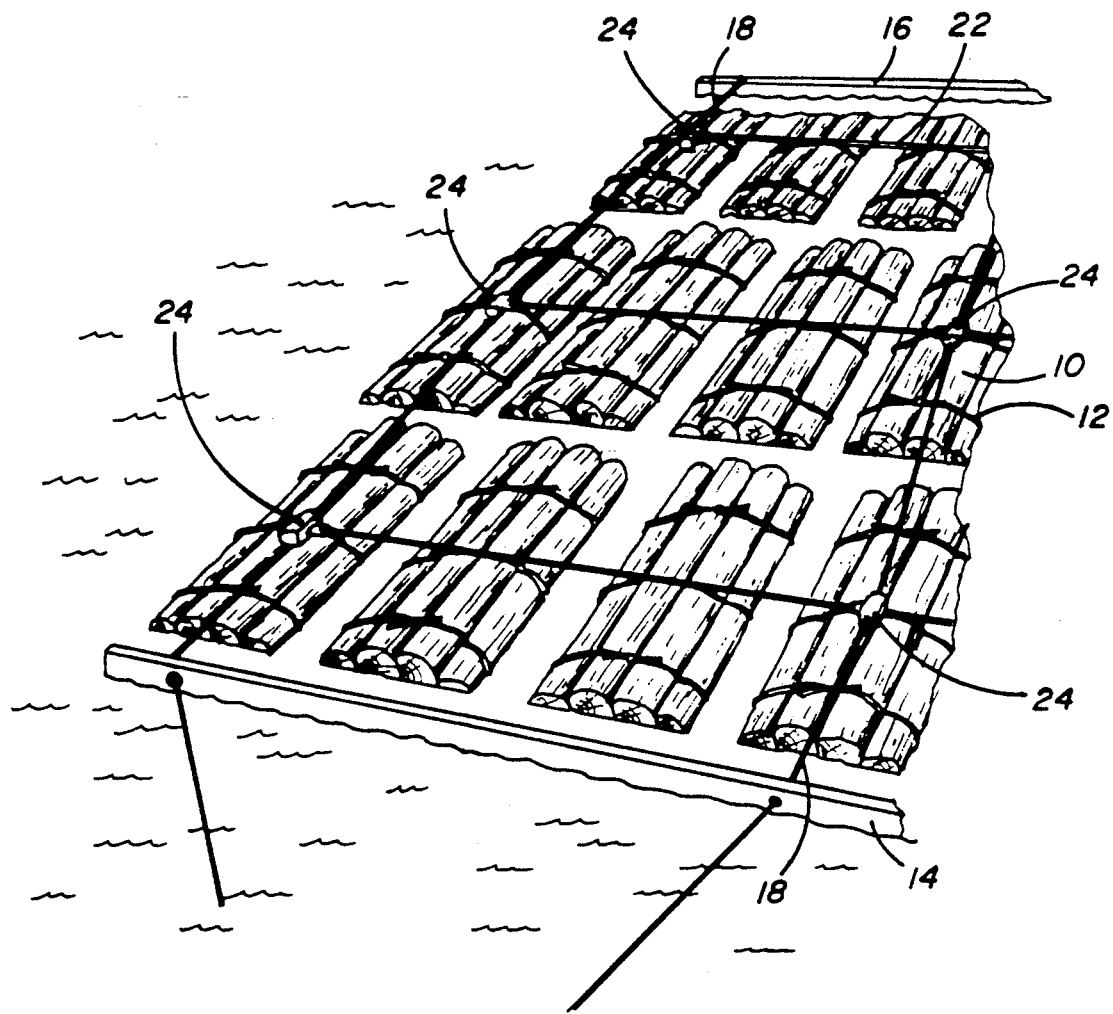
FIG. 1 is a schematic view of a floating log raft employing cable hooks in accordance with the present invention.

Referring to FIG. 1, there is shown a log raft comprising several bundles 10 of logs assembled together by means of encircling wire ropes or straps 12 cinched together by conventional fittings. The bundles are assembled in several rows between a head boom stick 14 and a tail boom stick 16 interconnected by longitudinal wire ropes 18 which are threaded under the encircling wire ropes 12, and attached at each end to the boom sticks. The bundles in each row are held together by means of swifter lines 22 which are attached at their extremities to the longitudinal lines 18 using transversally wedged-cable hooks 24 made in accordance with the present invention.

Figure 2:
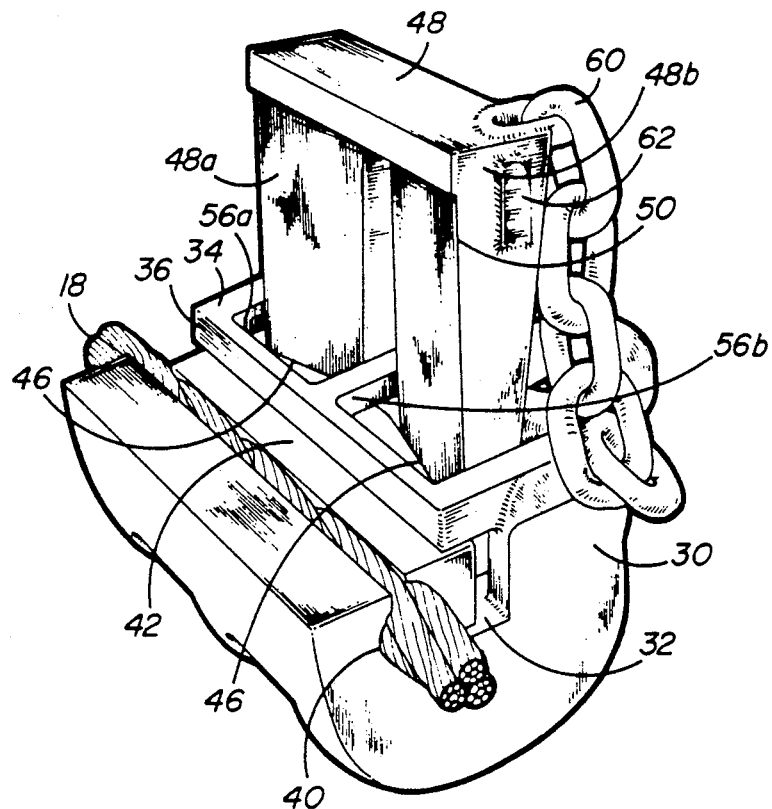
FIG. 2 is a perspective front view of the cable hook in accordance with the present invention.
Figure 3:
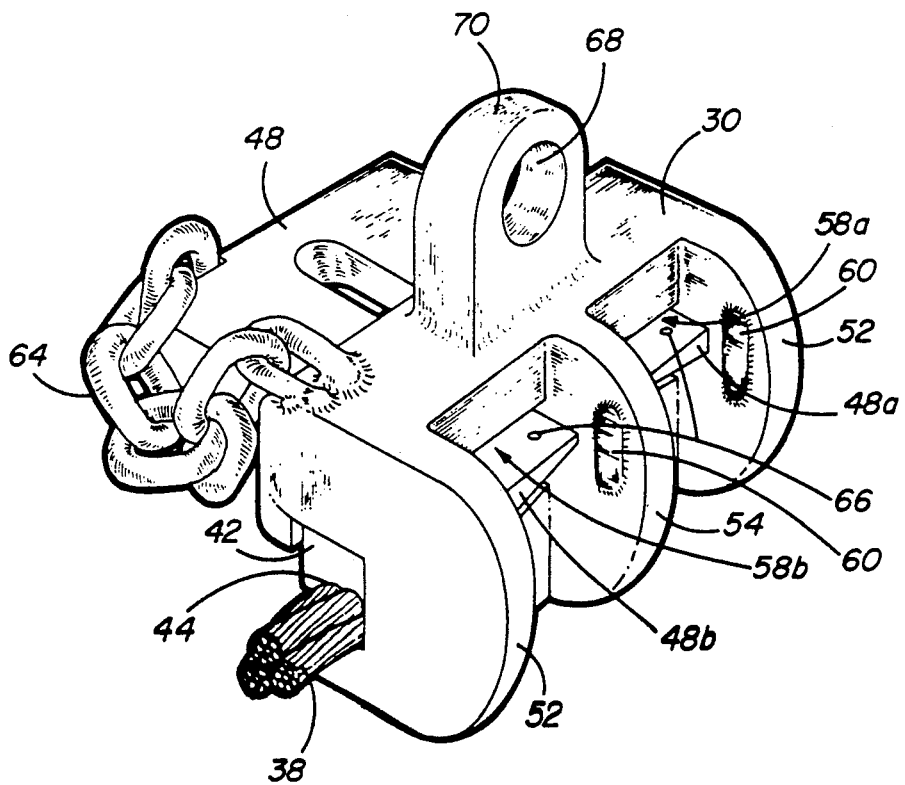
FIG. 3 is a perspective rear view of the cable hook.

Referring to FIGS. 2 and 3, the hook comprises a body member 30 having a longitudinal channel 32 formed therein. The body member has an extension 34 partly closing the top portion of the channel leaving a slot 36 for inserting a portion of the cable 18 into the channel. The channel is generally rectangular in cross-section and is provided with a cable engaging surface 40 on one wall thereof. A cable clamping member 42 is laterally movable in the channel and is provided with an inner surface 44 engaging the cable and a longitudinally double-tapered inverted V-shaped outer surface 46. A transverse wedge member 48 having a vertically tapered surface 50 is provided for driving the cable clamping member 42 against the cable in the channel. Referring more particularly to FIG. 3, the back portion of the body member is provided with transverse end reinforcing ribs 52 and a centre reinforcing rib 54. Because of the center reinforcing rib 54, the wedge member 48 is formed of two separate leg portions 48a and 48b joined at the top and inserted into corresponding apertures 56a and 56b in extension 34 and 58a and 58b in channel 32 of the body member 30. In addition to be vertically tapered, the leg portions of the wedge member 48 are oppositely tapered transversally so as to form a double-tapered surface mating longitudinally double-tapered surface 46 of the cable clamping member 42 to provide oppositely acting wedging surfaces generating increased clamping action during pulling of the cable in either direction. The wedge member and clamping member thus adjust themselves automatically to the direction of the applied load. In the absence of a center reinforcing rib, the leg portions of the wedge member 48 could be formed in a single piece and a single aperture provided through the extension 34 and channel 32 of the body member. The longitudinally double-tapered surfaces 46 are similar to the ones disclosed in U.S. Pat. No. 4,125,919 but the arrangement of the transverse wedge member 48 is totally different.

The inner face of the end reinforcing ribs 52 and both faces of the center reinforcing rib 54 may be provided with location pads 60 to ensure the self alignment and ease of insertion of the wedge member into the apertures in the hook. Location pads 62 may also be provided on the outside of legs 48a and 48b of the wedge member.

A chain 64 may be provided for attaching wedge member 48 to the body of the hook. In addition, the legs of the wedge member may be provided with a hole 66 for a wire retainer.

During installation, a hook is attached to each end of a swifter line by passing the end of the swifter line through a hole 68 provided in an eye 70 of the body member 30 and clamping it in any conventional way. The wedge member 48 of each hook is pulled back in order to free the clamping member 42 so that it can be withdrawn to allow insertion of the cable into the hook. A hook is attached to a longitudinal wire rope 18 at each extremity of a row of log bundles by inserting the wire rope into the slot 36 of the hook. The wedge member 48 is then driven in with a hammer to force the clamping member 42 into engagement with the wire rope to clamp the rope. The other rows of bundles are attached to the longitudinal wire ropes the same way.

Figure 4:
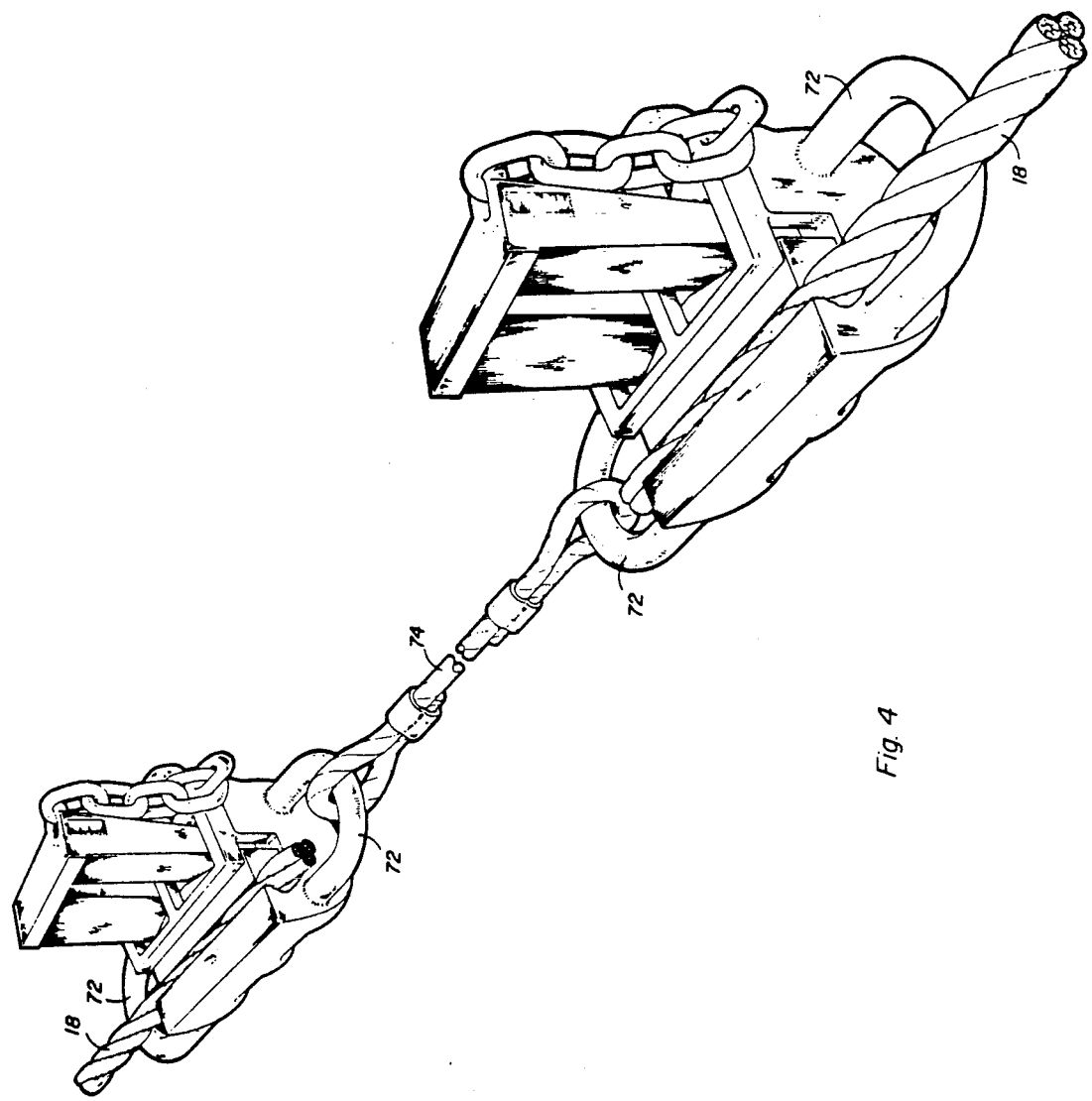
FIG. 4 illustrates a variation of the cable hook in accordance with the invention.

Although, the invention has been disclosed, by way of example, with reference to a preferred embodiment illustrated in FIGS. 2 and 3, it is to be understood that it is not limited to such embodiment and that other alternatives are also envisaged within the scope of the following claims. For example, the cable hook may be provided with ears 72 at one, preferably both ends thereof such as shown in FIG. 4. Such a modification would allow two hooks to be connected together by a line connector 72 between two portions of a longitudinal line 18, one attached to the head stick and the other to the tail stick.

The cable hook in accordance with the present invention may also be used as a general rigging clamp in the following applications:

1. Towing booms, dead ending lines for cranes, reavings, skylines, chairlifts, winches.
2. Tensioning lines in rigging, substituted for wire rope plate clamps, installation of hanging blocks on stationary or running lines.

We claim:

1. A cable hook comprising:
   a) a body member having a longitudinal channel of generally rectangular cross-section formed therein and an extension for partly closing the top of the channel leaving a longitudinal slot for inserting a portion of a cable into the channel, said channel having a cable engaging surface on one wall thereof;
   b) a cable clamping member laterally movable in said channel and having an inner surface engaging the cable and a longitudinally double-tapered inverted V-shaped outer surface;
   c) a transverse aperture extending through said body; and
   d) a wedge member insertable in said transverse aperture and having a vertically tapered surface for driving the cable clamping member against the cable in the channel and a transversally double-tapered surface mating the longitudinally double-tapered surface of said cable clamping member to provide oppositely acting wedging surfaces generating increased clamping action during pulling of the cable in either direction.

2. A cable hook is defined in claim 1, wherein the back portion of said body member is provided with transverse reinforcing ribs located at the opposite ends and the centre thereof, and wherein the wedge member is formed in two separate leg portions joined at the top, each leg portion engaging a separate tapered surface of the cable clamping member.

3. A cable hook as defined in claim 2, wherein said ribs and wedge member are provided with location pads to insure the self alignment and ease of insertion of the wedge member into the transverse aperture of the body.

4. A cable hook comprising:
   a) a body member having a longitudinal channel of generally rectangular cross-section formed therein for receiving a portion of a cable against one wall thereof; said body member having an extension for partly closing the top of the channel leaving a longitudinal slot for inserting the cable into the channel, said extension having an opening therein for allowing passage of a wedge member;
   b) a cable clamping member laterally movable in said channel and having an inner surface engaging the cable and a longitudinally double-tapered inverted V-shaped outer surface;
   c) a transverse aperture extending through said channel; and
   d) a wedge member insertable in said transverse aperture and having a vertically tapered surface for driving the cable clamping member against the cable in the channel and a transversally double-tapered surface mating the longitudinally double-tapered surface of said cable clamping member to provide oppositely acting wedging surfaces generating increased clamping action during pulling of the cable in either direction.

5. A cable hook comprising:
   a) a body member having a longitudinal channel of generally rectangular cross-section formed therein for receiving a portion of a cable against one wall thereof; the back portion of said body member is provided with transverse reinforcing ribs located at the opposite ends and the center thereof;
   b) a cable clamping member laterally movable in said channel and having an inner surface engaging the cable and a longitudinally double-tapered inverted .V-shaped outer surface;
   c) a transverse aperture extending through said channel; and
   d) a wedge member insertable in said transverse aperture and having a vertically tapered surface for driving the cable clamping member against the cable in the channel and a transversally double-tapered surface mating the longitudinally double-tapered surface of said cable clamping member to provide oppositely active wedging surfaces generating increased clamping action during pulling of the cable in either direction; the wedge member formed in two separate leg portions joined at the top, each leg portion engaging a separate tapered surface of the cable clamping member.

6. A cable hook as defined in claim 5, wherein said ribs and wedge member are provided with location pads to insure the self alignment and ease of insertion of the wedge member into the transverse aperture of the body.

* * * * *